Figure 1:
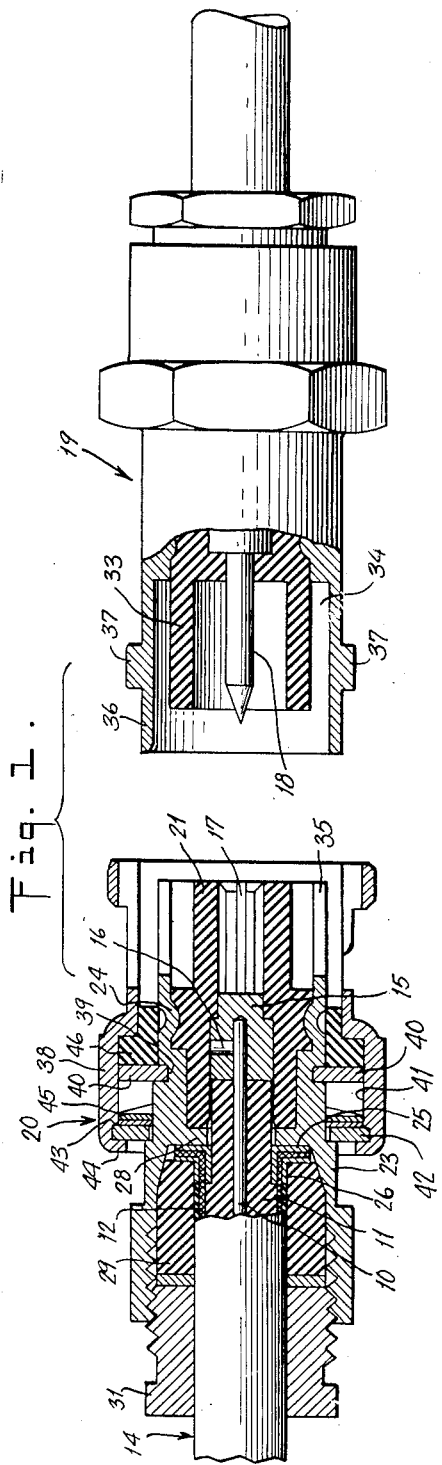

March 12, 1957  A. WICKESSER  2,785,384
MOISTURE PROOF MEANS FOR CONNECTING A
COAXIAL CABLE TO A FITTING
Filed Feb. 23, 1955

INVENTOR.
ARTHUR WICKESSER
BY
R. J. Dearborn
ATTORNEY

United States Patent Office 2,785,384
Patented Mar. 12, 1957

2,785,384

MOISTURE PROOF MEANS FOR CONNECTING A COAXIAL CABLE TO A FITTING

Arthur Wickesser, St. Albans, N. Y., assignor to The Liquidometer Corporation, Long Island City, N. Y., a corporation of Delaware Application February 23, 1955, Serial No. 490,044

1 Claim. (Cl. 339—94)

The present invention relates to a moisture proof means for connecting a coaxial cable to a fitting, and particularly to a means for connecting a coaxial cable, including quite small size coaxial cables, to associated fittings in a way which will be proof, not only against shorting or other damage incident to liquid water, but also against such damage incident to use in places where there is a high humidity.

The present invention is a continuation-in-part of applicant's prior and copending application Serial No. 419,816, filed March 30, 1954, for "Means for Securing a Connector Fitting to a Coaxial Cable." In particular, the present invention employs a feature of this copending application involving a pair of nestable eyelet members gripping on both a pair of cylindrical surfaces and also on a pair of plane or conical surfaces against the metallic filaments forming the outer braided conductor of a coaxial cable and holding these filaments in each instance by a metal-to-metal frictional contact. The present invention further provides means by which moisture is positively prevented from access to this connection between the eyelet members and the braided conductor element of the cable, which is usually the ground potential conductor thereof.

The moisture proofing effected in accordance with the present invention is accomplished by providing in the body member of the fitting a recess or chamber opening toward the rear end thereof, i. e. the end into which the cable to be joined to the fitting is led. The inner end of this recess or chamber is formed as a seat for the pair of eyelet members, which are in their operative position embracing the end portions of the filaments of which the outer braided conductor of the cable is formed. The zone of the recess or chamber immediately adjacent to the seat forming portion thereof as aforesaid is formed of progressively less radius as it approaches the inner or seat forming end of this recess or chamber. Outwardly thereof, the recess or chamber is formed, in a preferred form, with internal screw threads for cooperation with a hollow nut serving as one example of means for exerting pressure upon a deformable rubber composition member. This deformable member occupies the portion of the recess or chamber between the nut and the pair of eyelet members located in the seat forming portion of the chamber. When the nut is tightened, as a gland packing nut, the deformable rubber member is forced into the constricted portion of the recess or chamber and the deformation acts to cause the deformable material to fill all the interstices by a sort of flowing action, so as positively to prevent ingress of moisture which might cause shorting or other damage or malfunctioning to the connector. It has further been found that in order to be practically effective, the member of deformable material should have a substantially greater axial length than its radial thickness.

The remainder of the construction of the connector device may be essentially conventional from the point of view of the present invention. It will, however, be described in detail hereinafter.

Figure 2:
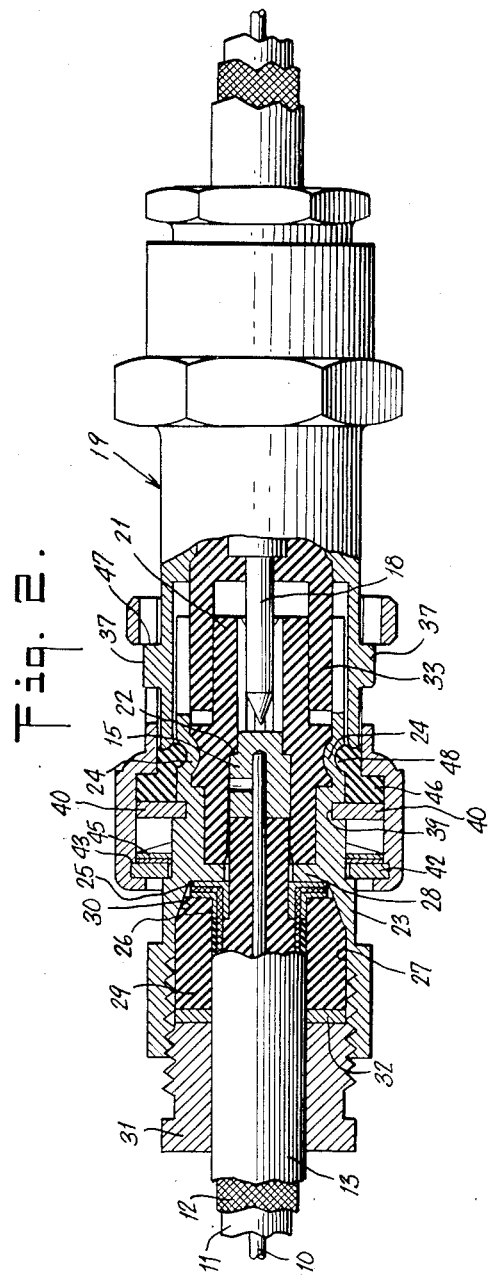

The invention may best be understood by reference to the accompanying drawings, in which:

Figure 1 shows a connector fitting in accordance with the present invention at the left and spaced therefrom at the right a cooperating fitting which may also be constructed in accordance with the present invention, the fitting at the left and a portion of the cooperating fitting being shown in central longitudinal section and the remainder of the parts being shown in elevation; and Fig. 2 is a view similar to Fig. 1 but with the cooperating fittings in the relative positions they occupy when they are connected one to the other.

The cable itself, the construction of which per se forms no part of the present invention, is shown as comprising a central conductor 10, surrounding which is an annular layer of insulating material 11, herein referred to as an inner insulating layer. While any suitable insulating material may be used, some of the smaller size coaxial cables, such as those of .090 and .123 inch diameter, employ as the insulating material 11 a polymer of tetrafluoro-ethylene, which has excellent electrical insulating and heat resisting properties. Surrounding the inner insulating layer is an outer conductor 12 of braided metallic filaments, which provides the maximum resistance to tensile stresses of any of the elements making up the cable. Surrounding the braided metallic conductor 12 is an outer insulating layer 13 of any desired material. The parts 10 to 13, inclusive, collectively make up the coaxial cable, which is generally indicated at 14.

Cable 14 is cut back so as to bare an outer end portion of the inner conductor 10 which may then be soldered or otherwise secured to a central contact member 15, this member being provided with a lateral hole 16 through which solder may be flowed into the recess into which the end of the central conductor 10 projects as shown in Fig. 1. The hole 16 also acts as a vent for air trapped by pushing a wire into the hole in contact member 15 and also may serve for outflow of excess solder. The outer end portion of the contact member 15 may be formed as a cup-shaped portion 17, as shown, for engagement with a stud member 18 of the cooperating fitting generally indicated at 19. Alternatively, the shapes of these members 15 and 18 may be interchanged, so that either may be the plug member and either the socket member. The construction of the remaining portion of the fitting 19 or the remaining portion of the left hand fitting shown generally at 20 may be otherwise identical irrespective of the particular type of central contact member which is used. It will be understood that a fitting embodying the present invention may be connected to a cooperating fitting part as the sectionalized portion shown in the drawings of the fitting 20, whether that part be a portion of a fitting connected to a piece of coaxial cable as shown or whether it be connected to and carried by some rigid part as a piece of electrical apparatus. The central member 15 including the portion 17 thereof is surrounded by a member 21 of suitable insulating material, which may be either of an organic plastic nature as the material 11 for example, or may be ceramic in character. The member 21 has an internal shoulder 22 engaging a correspondingly shaped external shoulder on the center contact member 15. This prevents movement of the member 15 to the right as seen in Figs. 1 and 2, while movement thereof to the left is prevented by the engagement of the left hand end of the member 15 as shown in the drawings with the insulating layer 11 of the cable 14, which is secured thereto by soldering the center conductor 10 into the member 15 as aforesaid. The insulating member 21 is secured within an annular body member 23 of the fitting by a number of depressed portions or stake points 24 of the member 23 entering into depressed portions of the member 21, these portions or stake points being provided in an annular series, only two of which are shown on the drawings, but four or more of which may be provided. These depressed portions or stake points may be formed at the factory where the fitting is produced, so as to anchor the insulating material 21 in place in the body member 23, the center contact 15 being inserted into these members 21—23 after this center contact 15 has been secured to the center conductor of the cable 14 as aforesaid.

Also, as taught in applicant's copending application Serial No. 419,816 aforesaid, the braided outer metallic conductor 12 has its end portion received between a first eyelet member 25 and a second eyelet member 26, each of these eyelet members having cylindrical sleeve portions arranged to be received one within the other and outwardly extending flange portions. The two eyelet members are of such relative sizes as set forth in said copending application that when they are disposed in nested position embracing the end portion of the braided metallic conductor 12, the filaments of this conductor are in metal-to-metal frictional contact both between the cylindrical portions of the eyelet members 25 and 26 and between the flange portions thereof.

Once the eyelet members 25 and 26 have been placed in position as shown with respect to the coaxial cable 14 and the center conductor 10 thereof has been secured to the center contact member 15, the cable and center contact member may be inserted into the interior of the body member 23 of the fitting with the nested eyelet members seated against the right hand end or innermost portion of a recess or chamber 27 opening to the left of the fitting, which is generally considered as to the rear thereof, i. e. the end into which the cable to be connected is inserted. In order to provide a seat for the nested eyelet members, the body member 23 of the fitting is provided with an inwardly directed annular flange 28 which forms the inner end of the recess or chamber 27. This limits movement of the nested eyelet members and of the cable to the right with respect to the body member 23, as seen in the accompanying drawings.

Means are provided for holding the nested eyelet members against their seat formed by the flange 28, such means in the present instance comprising a member 29 of a rubber or rubber composition material, which may be deformed under pressure and which under sufficient pressure will flow to fill any interstices or spaces available thereto. This member 29 is disposed within the recess or chamber 27, which recess or chamber is provided with an inner, progressively constricted zone 30 of progressively less radial dimension as it approaches the seat-forming end of the recess or chamber 27. This deformable member 29 has an axial dimension (horizontally as seen in the accompanying drawings), which is substantially greater than the radial thickness thereof (vertically on the drawing), which is an essential relationship in accordance with the experience had with devices of this kind in order to secure a necessary degree of resistance against humidity or moisture.

Means are provided for exerting axial pressure upon the member 29 to force it into the constricted portion 30 of the recess or chamber 27 and against the nested eyelet portions and also against the outside of the cable 14. For this purpose there is provided an annular nut 31 which has external threads meshing with internal threads in the outer end portion of the wall forming the recess or chamber 27. This nut thus acts as a gland nut in exerting deforming pressure upon the member 29, to the right as seen in the drawings. Disposed intermediate the end of the nut 31 and the deformable member 29 is an annular washer 32, which is useful in practice to prevent the rotation imparted to the nut 31 in tightening it from distorting the member 29 by torsional forces. The general purpose, therefore, of the members 31 and 32 is that they are jointly effective to exert axial pressure upon the deformable member 29, so as to cause it to secure the nested eyelet members in position as shown and also to fill any spaces or passages through which moisture could penetrate into the inner end of the recess or chamber 27, so as to short the cable or cause any damage thereto incident to the presence of humidity or moisture. This portion of the construction is that particularly embodying the present invention.

Considering now the relationship of the parts of the cooperating fittings 19 and 20, the fitting 19 has an annular insulating member 33, which has a function generally similar to that of the member 21 and which is essentially the same as the member 21 with the exception of the shape of the outer end portion thereof which is directed toward the cooperating fitting 20. This outer end portion is cup-shaped as shown and has an inside diameter sufficient to encompass the outside diameter of the forward portion of the member 21 as shown particularly in Fig. 2, in which the parts are shown in their connected position.

Further, in the fitting 19 there is an annular recess 34, which is opposite the axially slotted end portion 35 of the body member 20, so that the portion 35 projects into the recess 34 at the connected position of the parts as shown in Fig. 2. It will be understood that in the normal use of the connectors, the braided conductor 12 is grounded, so that this conductor, the eyelet members 25 and 26 and the body 23 of the fitting 20 are all at ground potential. The axial slotting of the portion 35 of the body 23 is normally done to give a spring ground connection between the fittings 19 and 20, the slit sections of the portion 35 coming into contact with an annular portion 36 of the body member of the fitting 19, which has an inside diameter sufficient to encompass the portion 35.

While it is contemplated that various schemes, all of which as far as is known have been used in one device or another, may be employed for holding the fittings 19 and 20 together, there is illustrated in the accompanying drawings a bayonet type connection including two or more outwardly extending studs as shown at 37 for the fitting 19 which are cooperable with a suitable formed clamp member 38, which is arranged for limited axial sliding movement on and outside of the body member 23 of the fitting 20. For this purpose the body member 23 is provided with an annular groove 39. Seated in this groove are a pair of semi-annular members 40, which together form the equivalent of an annular washer and which are in sliding contact at their outer periphery with an inner cylindrical portion 41 of the clamp member 38. There is also received in the left hand portion (as seen in the drawings) of the clamp member 38 an annular washer 42, which is first seated against a shoulder 43 in the member 38 and then is secured in its position by spinning over the washer 42 a peripheral end portion 44 of the clamp member 38, so as to hold all the parts in the positions shown in the drawings. Disposed between the washer 42 and the pair of semi-annular members 40 are one or more spring washers 45, which bear against the washer 42 on the left and the semi-annular washer members 40 on the right (both as shown in the accompanying drawings) and thus urge the clamp member 38 to the left as seen in the drawings.

Movement of the clamp member 38 to the left beyond the position shown in Fig. 1 is prevented by an annular deformable gasket member 46 of rubber or rubber composition material, which is substantially L-shaped in cross-section as shown in Fig. 1 and which has an axial dimension as to its inner portion at least as great as its greatest radial dimension. Thus, as seen in Fig. 1, the clamp member 38 is urged to the left by the spring washers 45, but cannot move beyond the position shown in Fig. 1 without distorting or deforming the member 46. The spring washers are not sufficiently powerful to effect such distortion, so that the parts have a normal position as shown in Fig. 1.

The arrangement is such that when the cooperating fittings 19 and 20 are brought together to engage the lugs 37 behind shoulders as shown at 47 in Fig. 2, the portion 36 of the body member of fitting 19 enters into what may be termed a forwardly-opening annular slot formed between the forward portion of the member 38 and the portion 35 of the body member 23, the forward edge portion of the part 36 of the body of the fitting 19 pressing into the right hand portion as seen in the drawings of the deformable member 46. Then due to the deformable and somewhat flowable character of this member 46, the material thereof is caused to move into and completely to fill all accessible spaces and interstices including, for example, the depressions formed at the stake points 24 as shown at 48 in Fig. 2. This, combined with the peculiar shape of the member 46 and the relative dimensions thereof, effects a tight sealing between the clamp member 38 on the one hand and the body portion 23 of the fitting 20 on the other, notwithstanding the slight movement to the right (as seen in the drawing) of the clamp member 38 under the influence of the force applied between the lugs 37 and the cooperating shoulders at 47 and against the tension of the spring washers 45. This in turn results in the practical weatherproofing of this portion of the fittings.

This subject matter, i. e. the weatherproofing based upon the peculiarly shaped member 46 is no part of the present invention, but is the invention of Joseph J. Figueira as set forth in his application Serial No. 490,045, filed February 23, 1955. The description of this portion of the device is included in the present disclosure, so that this disclosure may be complete in all its phases as to a preferred form of the entire apparatus. It is contemplated, however, that the novel moisture proofing provisions of the present invention, i. e. those which have to do with the use of the member 29 and its associated parts, may be used independently of devices using a moisture proofing member as shown at 46 and as hereinabove described; in other words, either could be used without the other, as each contributes its own part to the overall result.

While there is herein shown and described but one principal form of the present invention, and certain alternatives have been indicated as the description proceeded, other equivalents and alternatives will suggest themselves to those skilled in the art from the foregoing disclosure. I do not wish to be limited, therefore, except by the scope of the appended claim, which is to be construed validly as broadly as the state of the prior art permits.

What is claimed is:

Moisture proof means for connecting a coaxial cable to a fitting, in which the coaxial cable to be connected comprises a central conductor, an inner insulating layer surrounding said central conductor, an outer conductor of braided metallic filaments surrounding said inner insulating layer, and an outer insulating layer surrounding the braided metallic conductor; and in which the connection between said coaxial cable and said fitting comprises a pair of nestable metallic eyelet members, including a first eyelet member having an inner, substantially cylindrical sleeve portion and a forwardly disposed annular flange portion and a second eyelet member having an outer substantially cylindrical sleeve portion and a rearwardly disposed annular flange portion, said sleeve portions in the assembled fitting being disposed respectively inside and outside an end portion of said braided metallic conductor and said eyelet members being nested together so as tightly to grip the outer ends of the metallic filaments of said braided conductor with a metal-to-metal grip between the flange portions thereof, and said sleeve portions of said eyelet members being telescoped one within the other in a concentric manner and being of such relative sizes as tightly to grip the end portion of said braided conductor therebetween with a metal-to-metal frictional grip with the sleeve portion of said first eyelet member surrounding said inner insulating layer of said coaxial cable; said fitting further comprising an annular body member having an inwardly extending annular flange terminating at its radial inner portion adjacent to said inner insulating layer of said cable and bearing against the forward side of said annular flange portion of said first eyelet member after said eyelet members have been brought to their nested position aforesaid in gripping engagement with an end portion of said braided conductor, said body member further having a rearwardly open recess for receiving the nested eyelet members as aforesaid at its inner end and having a forwardly constricted wall immediately in rear of the nested eyelet members, an annular moisture proofing member having a substantially cylindrical external shape when not deformed by compression, the outer diameter of said external shape being substantially equal to the larger inner diameter of the frusto-conical portion of said recess defined by said constricted wall, said annular member being of greater axial length than its radial thickness and of a rubber composition which is deformable in a flowable manner under pressure located within said recess in rear of said nested eyelet members and in contact therewith, an annular nut for applying axial pressure to said deformable moisture proofing member for compressing said annular member into the frusto-conical portion of said recess defined by said constricted wall; central contact means adapted to be secured to the central conductor of said cable, and insulating means carried by said body member and arranged to locate and secure said central contact means therein.

References Cited in the file of this patent
UNITED STATES PATENTS

| 2,134,946 | Hurley | Nov. 1, 1938 |
| 2,296,766 | Bruno | Sept. 22, 1942 |
| 2,540,012 | Salati | Jan. 30, 1951 |